Dec. 26, 1939.   K. KONOPICKY   2,184,601
MANUFACTURE OF CERAMIC WARE
Filed July 5, 1935
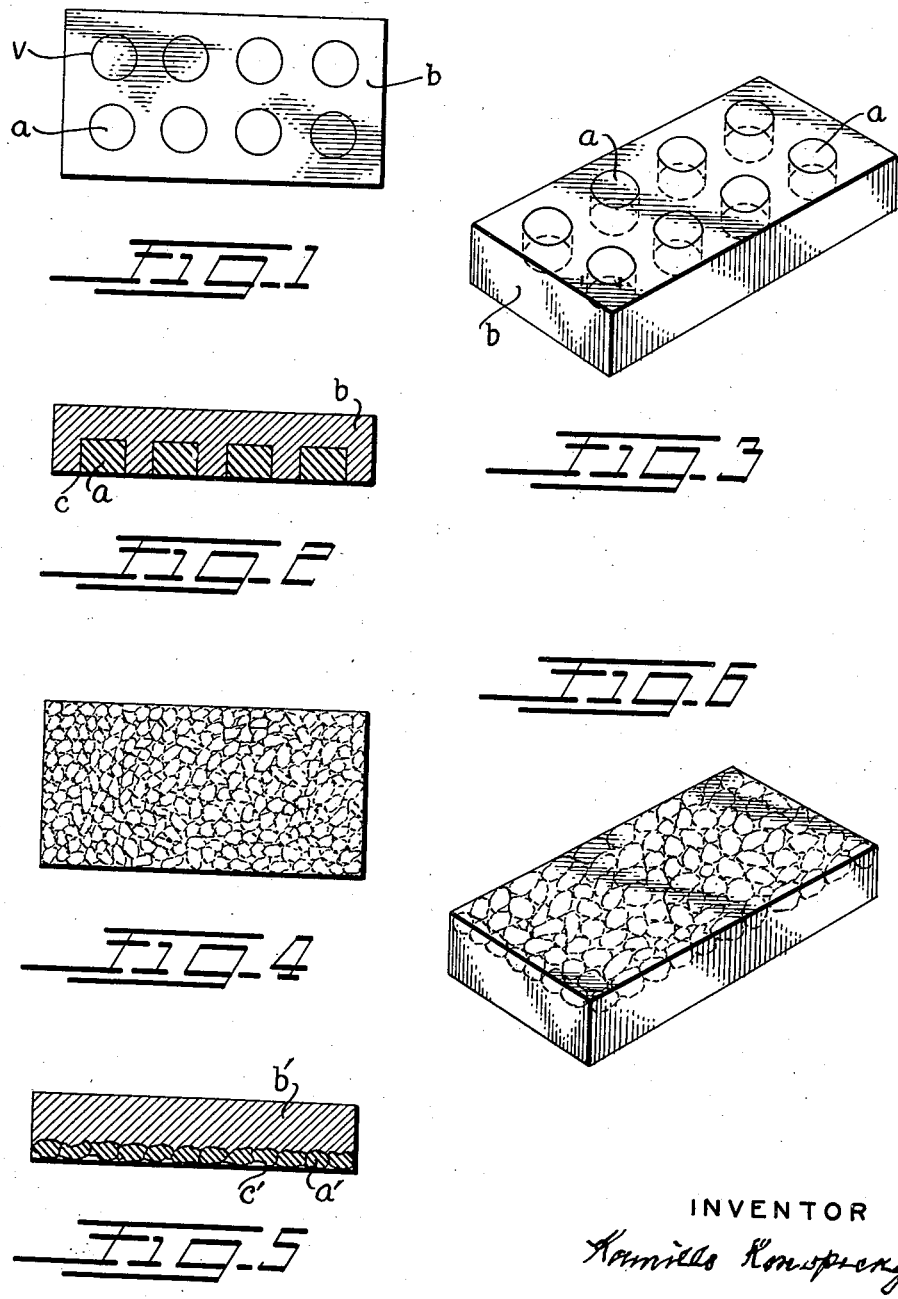
INVENTOR
Kamillo Konopicky
BY William E. Evans
Attorney Patented Dec. 26, 1939

2,184,601

UNITED STATES PATENT OFFICE 2,184,601

MANUFACTURE OF CERAMIC WARE

Kamillo Konopicky, Krefeld-Linn, Germany

Application July 5, 1935, Serial No. 29,857
In Germany July 6, 1934

2 Claims. (Cl. 72—37)

The present invention relates to all kinds of ceramic ware that are exposed to sudden considerable changes of temperature and it relates particularly to refractory bricks.

It is known that the spalling of ceramic articles readily leads to the formation of fine cracks and so to the breaking of the articles, in consequence of the high stresses which arise. It has already been attempted in the ceramic industry, particularly in that section concerned with refractory products, to raise the resistance to spalling by carefully arranging the distribution of the grains by size or by providing suitable additions to the material.

According to the present invention the ceramic articles are divided in the manner of a honeycomb by dividing surfaces for increasing the resistance to spalling. These ceramic articles thus divided may, according to the invention, be produced in various ways.

The cells may be first moulded of a suitable size, and the surface of the cells provided with the material forming the dividing surface, whereupon the cells so prepared, with or without the addition of finely divided particles, are moulded to produce the final product; to produce this effect it has no considerable importance if an inconsiderable part of the dividing surfaces be broken during the finishing moulding. It is possible however to work into the article a honeycomb-shaped structure of oxidisable metal foil or metal oxide foil during moulding.

The distance between the dividing surfaces of the honeycomb-shaped structure obviously depends upon the nature and the structure of the refractory base mass. It has been observed that the favourable effect on the resistance to spalling as hereinbefore described commences when the dividing surfaces are about 0.8 mm. apart and are no longer seen when the distance is 0.5 mm. Consequently the honeycomb-shaped structure of the dividing surfaces can be obtained by separating the coarse grains of the ceramic mass from the remaining mass by an interposed surface. When producing a ceramic article that is resistant to spalling the coarse grains are consequently first enveloped in the material forming the dividing surface and thereupon mixed with the finer particles, the mass being then further treated in the usual manner.

As a general rule when producing ceramic articles resistant to spalling the material selected for the dividing surfaces must be substances or mixtures of substances which have a smaller tensional strength than the base mass at the burning temperatures of the article or when in actual use, or, by growing during the burning operation, impart to the base mass a preliminary compressive strength but in no case must they enter into combination with the base material or parts thereof which are easily fusible or easily sinter, during the burning operation or at the temperature at which it is used, or themselves readily sinter or fuse. The thickness of the sheet forming the dividing surfaces must be determined in each individual case by experiment. Usually it is desired to keep the quantity of the material forming the dividing surface as low as possible; in any case too thin a sheet should not be selected as otherwise the resistance to spalling decreases. Furthermore it is important to maintain a certain thickness (for example 0.1 mm.) as is necessary when working-in a honeycomb-shaped structure during moulding, in order to impart the necessary mechanical strength to the honeycomb-shaped structure.

The invention hereinbefore described usually falls into two parts:

1. In producing ceramic articles which are resistant to spalling (for example bricks or magnesite or chromium ore) the coarse grains will, when the proportion of coarse grain to middle size grain and to fine grain has been correctly selected, be enclosed in substances that give dividing surfaces. These interposed surfaces separate in some measure the coarse grains from the remainder of the mass. The dividing surfaces may consist for example of the following substances:

For sintered or fused magnesia, aluminium compounds or mixtures containing such compounds and/or chromium compounds;

For chromium ore, magnesia or compounds of magnesia, or mixtures containing such compounds and/or aluminium compounds, as well as talcum or similar magnesium silicates.

In order that there shall be a reliable adhesion to the coarse grains the substance from which the interposed surface is made may be applied to the coarse grains with neutral organic or inorganic binders (for example mixtures containing magnesia cements). In the case of sintered or fused magnesia the substance forming the interposed surface may be applied by precipitation from solutions of aluminium salts.

The enveloped coarse grains are then mixed with the quantity of fine grain (and sometimes also with a little intermediate size grain) which has been determined by experiment. Naturally the chemical constitution of the coarse grains must not be identical with that of the remaining mass; generally it is advantageous for the coarse grains to form 50 to 80% of the total mass.

The dividing surfaces may however be produced by first moulding cells, then enveloping these cells with the material forming the dividing surface and finally moulding with or without the addition of grained material. The moulding of the individual cells may be carried out for example on plunger presses or extrusion presses.

2. A honeycomb-shaped structure of metal foil or metal oxide foil may be placed in the mould and compressed with the granular mass. For the purpose aluminium foil or aluminium oxide foil may for example be employed for burnt magnesites containing a large percentage of iron, while iron foil or iron oxide foil may be employed for burnt magnesites containing a small percentage of iron. Generally, when producing with a honeycomb-shaped structure which remains in the material, the honeycomb-shaped structure must consist of a substance which at the working temperatures used has a smaller tensional strength than the base mass or which imparts to the base mass a preliminary pressure by growing during burning. A honeycomb-shaped structure of aluminium foil or aluminium oxide foil is particularly suitable for the production of bricks of chromium ore or chromium ore and magnesia.

The cells of the articles divided like a honeycomb may be of any suitable shape but for practical reasons connected with manufacture it is preferable to make them circular, hexagonal or square in cross-section.

The most preferred cross-sectional area for the individual cells is from 2 to 10 sq. cms. Within these limits the cross-section varies according to the substance used and can be determined by calculation or by experiment. The depth of the honeycomb-shaped division in the base material is partly determined by the nature of the material in question but it will certainly depend upon the dimensions of the body of the mould. For ordinary refractory bricks a depth of 2 to 4 cm. is usually suitable. Naturally it is preferable that the base mass selected shall be one which possesses an extremely high resistance to spalling, either by correct selection of the distribution of the different sizes of grain or by the use of suitable additions.

The accompanying drawing illustrates methods of carrying out the invention by way of example.

Figure 1 is a plan of a refractory brick made of sintered magnesia comprising preliminarily moulded cylindrical bodies inserted into the base mass.

Figure 2 is a longitudinal section taken through the brick.

Figure 3 shows a brick in perspective.

Figure 4 is a plan of a refractory chromium magnesite brick which is formed of a base mass with embedded ball-shaped structures.

Figure 5 is a longitudinal section through the brick according to Figure 4, and

Figure 6 shows the finished brick in perspective.

The refractory brick shown in Figures 1 and 3 is produced as follows: Previously moulded cylindrical bodies $a$ made from sintered magnesite containing a large percentage of iron are placed in the mould of an hydraulic press. The cylindrical bodies are produced in an extrusion press, the surface being at the same time powdered with aluminium oxide $c$ in a state of very fine division forming an interface of dividing material in the final product. Thereupon the remainder of the same sintered magnesite is poured in forming the main body portion $b$ and compressed, dried and burnt in the usual manner. After the burning the brick is divided to a suitable depth by a fine honeycomb-shaped structure of aluminium oxide on the side exposed to spalling.

The brick according to Figures 4 to 6, inclusive is produced in the following manner: A composition $a'$ formed of about 100 gms. each of chromium ore and magnesia is wrapped in aluminium foil $c'$; the spherical structures produced are placed in the pressing mould whereupon the remainder of the same composition $b'$ is poured in, forming a final ceramic product in which the bodies of the composition $a'$ are separated from the main body $b'$ of the ceramic material by an interface of dividing material comprising the aluminum foil which does not enter into chemical combination with the adjacent surfaces during the firing or burning of the brick or ceramic building element.

By the term "interface" as employed in the claims, I mean the spaces or film-like dividing surfaces forming the common boundaries between the faces of the bodies in the surfacing portion of the element and the main body portions.

I claim:

1. A ceramic building element resistant to spalling which comprises a base mass of ceramic material forming the main body portion of said element, and a surfacing material comprising bodies of ceramic material spaced at least at the portions of the said bodies adjacent the outer surface of the element, from the adjacent ceramic material by interfaces of dividing material of less tensional strength than the said base mass and which is non-reactive with the material of the adjacent surfaces at the temperatures to which it is subjected during the formation of the said element.

2. A ceramic building element resistant to spalling which comprises a mass of ceramic material forming the main body portion of said element, and a surfacing portion comprising bodies of ceramic material arranged in the surface of the element subject to spalling, the bodies of the surfacing portion being spaced from the adjacent ceramic material at the lateral portions of the said bodies and also from the said main body portion by dividing interfaces composed of a material which does not enter into chemical combination to any substantial extent with the adjacent surfaces during the formation of said element.

KAMILLO KONOPICKY.